US012017411B2

(12) United States Patent
Kajita et al.

(10) Patent No.: US 12,017,411 B2
(45) Date of Patent: Jun. 25, 2024

(54) ADDITIVE MANUFACTURING APPARATUS AND ADDITIVE MANUFACTURING METHOD

(71) Applicant: SINTOKOGIO, LTD., Nagoya (JP)

(72) Inventors: Kouji Kajita, Nagoya (JP); Kazuya Kojima, Nagoya (JP); Takaya Nakane, Nagoya (JP)

(73) Assignee: SINTOKOGIO, LTD., Nagoya (JP)

( * ) Notice: Subject to any disclaimer, the term of this patent is extended or adjusted under 35 U.S.C. 154(b) by 0 days.

(21) Appl. No.: 17/833,991

(22) Filed: Jun. 7, 2022

(65) Prior Publication Data

US 2022/0396029 A1  Dec. 15, 2022

(30) Foreign Application Priority Data

Jun. 10, 2021 (JP) .................. 2021-097437

(51) Int. Cl.

| | |
|---|---|
| *B29C 64/218* | (2017.01) |
| *B29C 64/135* | (2017.01) |
| *B29C 64/232* | (2017.01) |
| *B29C 64/236* | (2017.01) |
| *B29C 64/245* | (2017.01) |
| *B29C 64/268* | (2017.01) |
| *B33Y 30/00* | (2015.01) |

(Continued)

(52) U.S. Cl.
CPC .......... *B29C 64/218* (2017.08); *B29C 64/135* (2017.08); *B29C 64/232* (2017.08); *B29C 64/236* (2017.08); *B29C 64/245* (2017.08); *B29C 64/268* (2017.08); *B33Y 10/00* (2014.12); *B33Y 30/00* (2014.12); *B33Y 70/10* (2020.01)

(58) Field of Classification Search
CPC ... B29C 64/218; B29C 64/135; B29C 64/232; B29C 64/236; B29C 64/245; B29C 64/268; B33Y 10/00; B33Y 30/00; B33Y 70/10; B22F 1/10; B22F 10/12; B22F 12/50; B22F 12/224; B22F 12/63; B22F 12/90

See application file for complete search history.

(56) References Cited

U.S. PATENT DOCUMENTS 9,423,756 B2    8/2016  Hanson et al.
2020/0001530 A1*  1/2020  Stroud .................... B22F 12/52
(Continued)

FOREIGN PATENT DOCUMENTS

DE   10 2020 001 068 A1   8/2021
JP   2016-203425 A        12/2016

*Primary Examiner* — Michael M. Robinson

(74) *Attorney, Agent, or Firm* — Faegre Drinker Biddle & Reath LLP

(57) ABSTRACT

An additive manufacturing apparatus configured to laminate a plurality of thin films to form a modeled object, the additive manufacturing apparatus including a stage; a roll coater, including a first roll and a second roll, configured to form each of the thin films, the thin film being made of a modeling material, the modeling material being a material of the modeled object; and a drive unit configured to move the roll coater on the stage, the roll coater: is arranged so that the second roll is located on the stage; passes the modeling material between a first roll surface of the first roll and a second roll surface of the second roll; and the drive unit moves the roll coater on the stage in a direction orthogonal to the second axis, and thereby laminates the thin film, formed on the second roll surface, onto the stage.

5 Claims, 6 Drawing Sheets

(51) Int. Cl.
*B33Y 10/00* (2015.01)
*B33Y 70/10* (2020.01)

(56) References Cited

U.S. PATENT DOCUMENTS

2021/0323190 A1\* 10/2021 Shambley ............... B22F 12/52
2021/0339469 A1\* 11/2021 Fujita .................... B29C 64/223
2022/0193995 A1\* 6/2022 Barnes ................... B22F 12/20
2022/0212266 A1\* 7/2022 Jeannot ................. B29C 64/343
2023/0109613 A1 4/2023 Mathea \* cited by examiner

ADDITIVE MANUFACTURING APPARATUS AND ADDITIVE MANUFACTURING METHOD

CROSS-REFERENCE TO RELATED APPLICATION

This application is based on Japanese Patent Application No. 2021-097437 filed with Japan Patent Office on Jun. 10, 2021, the entire contents of which are hereby incorporated by reference.

TECHNICAL FIELD

The present disclosure relates to an additive manufacturing apparatus and an additive manufacturing method.

BACKGROUND

In Japanese Unexamined Patent Publication No. 2016-203425 discloses an additive manufacturing apparatus for manufacturing a laminated modeled object. This additive manufacturing apparatus has a blade with a pointed edge at a lower part. The additive manufacturing apparatus horizontally moves the blade against the paste-like material, having fluidity, supplied to the stage. This flattens the material and forms a layer.

Technical Problem

In the additive manufacturing apparatus described in Japanese Unexamined Patent Publication No. 2016-203425, moving the blade at high speed may cause scratch damage to the layer made of the material. This makes it necessary to move the blade at a low speed to evenly flatten the entire surface of the layer. Therefore, it may take time to manufacture the laminated modeled object. The present disclosure provides a technique capable of increasing a manufacturing speed of a laminated modeled object.

Solution to Problem

An additive manufacturing apparatus according to one aspect of the present disclosure is an additive manufacturing apparatus for laminating a plurality of thin films to form a modeled object. The additive manufacturing apparatus includes a stage, a roll coater, and a drive unit. The roll coater has a first roll and a second roll. The roll coater forms each of the thin films made of a modeling material that is a material of the modeled object. The drive unit moves the roll coater on the stage. A first roll rotates around a first axis, in a first direction, at a first peripheral speed. The second roll is arranged apart from the first roll. The second roll rotates around a second axis parallel to the first axis, in a direction opposite to the first direction, at a second peripheral speed faster than the first peripheral speed. The roll coater is arranged so that the second roll is located on the stage. The roll coater passes the modeling material between a first roll surface of the first roll and a second roll surface of the second roll, and thereby forms the thin film on the second roll surface. The drive unit moves the roll coater on the stage in a direction orthogonal to the second axis, and thereby laminates the thin film, formed on the second roll surface, onto the stage.

In this additive manufacturing apparatus, the modeling material is formed into the thin film between the first roll surface and the second roll surface. The thin film of the modeling material is formed on the second roll surface of the second roll having a faster peripheral speed than the first roll. The drive unit moves the roll coater on the stage in a direction orthogonal to the second axis. The thin film on the second roll surface is laminated onto the stage. Therefore, this additive manufacturing apparatus can increase a moving speed of the roll coater without considering scratch damage to the thin film of the modeling material. Therefore, this additive manufacturing apparatus can increase a speed of manufacturing the modeled object as compared with an additive manufacturing apparatus forming layers with a blade.

In one embodiment, the drive unit may move the roll coater on the stage at a feed speed faster than the second peripheral speed. Since the thin film of the modeling material moves to the stage side where the speed is high, this additive manufacturing apparatus can reliably laminate the thin film of the modeling material.

In one embodiment, the modeling material may include a photocurable resin and a sintering material. The modeling material including the photocurable resin and the sintering material is formed into the thin film between the first roll surface and the second roll surface. The additive manufacturing apparatus can form a modeling material, including the photocurable resin and the sintering material, thinner than an additive manufacturing apparatus forming a layer with a blade. Since light is easily transmitted through the thin film containing the thinly formed photocurable resin and sintering material, curing failure of the modeling material is reduced in this additive manufacturing apparatus.

In one embodiment, at least one of the first roll surface and the second roll surface may be made of ceramic. Making the surface of ceramic causes at least one of the first roll surface and the second roll surface to be prevented from wear by the sintering material, as compared to the case in which at least one of the first roll surface and the second roll surface is made of a metal or the like.

The roll coater may have a third roll. The third roll may be arranged apart from the first roll. The third roll may rotate around a third axis parallel to the first axis in the direction opposite to the first axis at a third peripheral speed slower than the first peripheral speed. The roll coater may pass the modeling material between the third roll surface of the third roll and the first roll surface to form a thick film, of the modeling material, thicker than the thin film on the first roll surface. The roll coater may pass the thick film between the first roll surface and the second roll surface to form the thin film, of a modeling material, on the second roll surface. The modeling material is formed into the thick film between the third roll surface and the first roll surface. The thick film of the modeling material is formed on the first roll surface of the first roll having a faster peripheral speed than the third roll. The thick film on the first roll surface is formed into the thin film between the first roll surface and the second roll surface. With the configuration having the third roll, the thin film on the second roll surface is formed from the thick film of the modeling material formed between the third roll surface and the first roll surface. This configuration allows forming the thin film with a more uniform thickness than a configuration without the third roll.

In one embodiment, the additive manufacturing apparatus may further include a supply unit for supplying the modeling material to the roll coater, and an irradiation unit for radiating a laser light for curing the thin film laminated on the stage.

An additive manufacturing method according to another aspect of the present disclosure is an additive manufacturing method in which a plurality of thin films are laminated on a stage to form a modeled object. The additive manufacturing method includes rotating a first roll and a second roll, the thin film forming, and laminating thin films. Rotating a first roll and a second roll includes, in a roll coater including a first roll and a second roll, rotating the first roll around a first axis in a first direction at a first peripheral speed, and rotating the second roll, arranged apart from the first roll, around a second axis parallel to the first axis in a direction opposite to the first direction at a second peripheral speed faster than the first peripheral speed. Thin film forming includes passing a modeling material between a first roll surface of the first roll and a second roll surface of the second roll and thereby forming each of the thin films, made of the modeling material, on the second roll surface. Laminating thin films includes arranging the roll coater so that the second roll is located on the stage, then moving the roll coater in a direction orthogonal to the second axis, and thereby laminating the thin film, formed on the second roll surface, onto the stage.

In this additive manufacturing method, the modeling material is formed into the thin film between the first roll surface and the second roll surface. The thin film of the modeling material is formed on the second roll surface of the second roll having a faster peripheral speed than the first roll. The drive unit moves the roll coater on the stage in a direction orthogonal to the second axis. The thin film on the second roll surface is laminated onto the stage. Therefore, this additive manufacturing method can increase a moving speed of the roll coater without considering scratch damage to the thin film of the modeling material. Therefore, this additive manufacturing method can increase a speed of manufacturing the modeled object as compared with an additive manufacturing method forming a layer with a blade.

In one embodiment, the drive unit may move the roll coater on the stage at a feed speed faster than the second peripheral speed. Since the thin film of the modeling material moves to the stage side where the speed is high, this additive manufacturing method can reliably laminate the thin film of the modeling material.

In one embodiment, the modeling material may include a photocurable resin and a sintering material. The additive manufacturing method may further include separating the photocurable resin from the modeled object by heat treatment, and a sintering the sintering material by heat treatment. The modeling material is formed into the thin film between the first roll surface and the second roll surface. This additive manufacturing method can form the modeling material containing the photocurable resin and the sintering material thinner than an additive manufacturing method forming a layer with a blade. Since light is easily transmitted through a thin film containing the thinly formed photocurable resin and sintering material, curing failure of the photocurable resin is reduced in this additive manufacturing method.

Advantageous Effects of Invention

According to the technique according to the present disclosure can increase the manufacturing speed of additive manufacturing.

DETAILED DESCRIPTION

Figure 1:
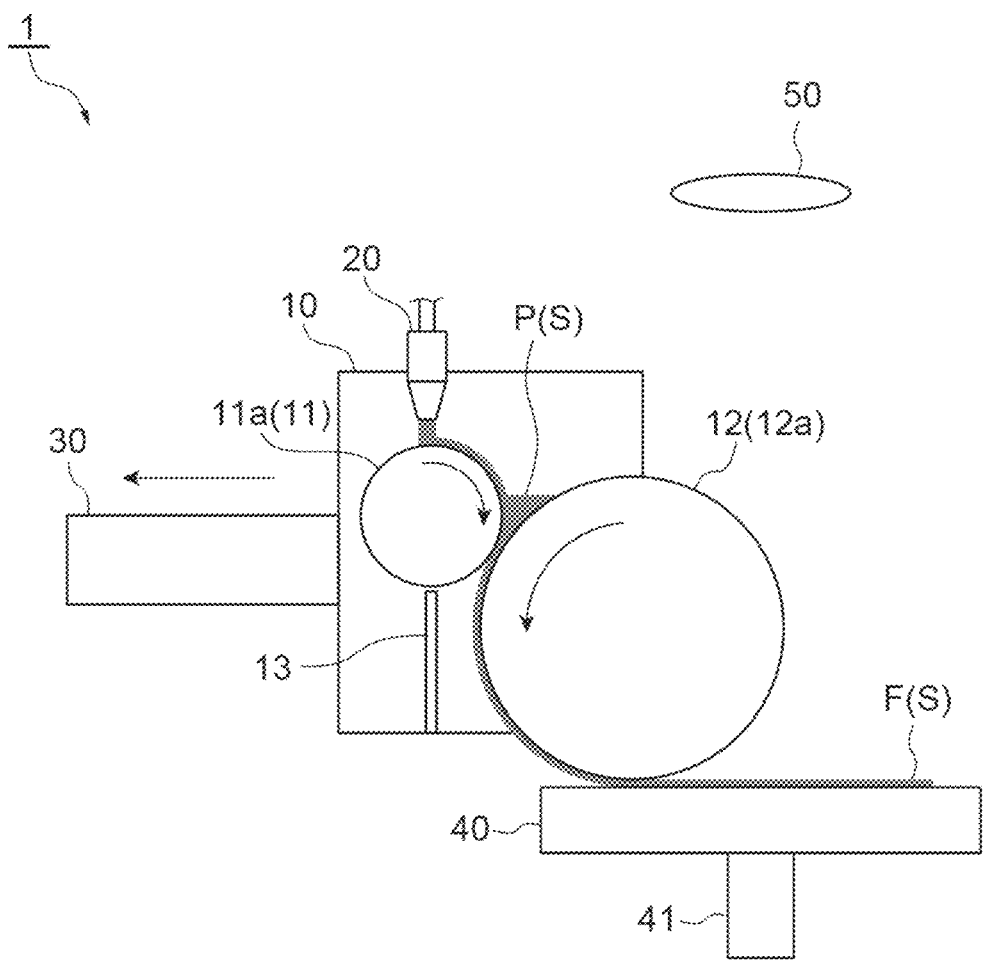
FIG. 1 is a schematic diagram showing a configuration of an additive manufacturing apparatus according to an embodiment.
Figure 1:
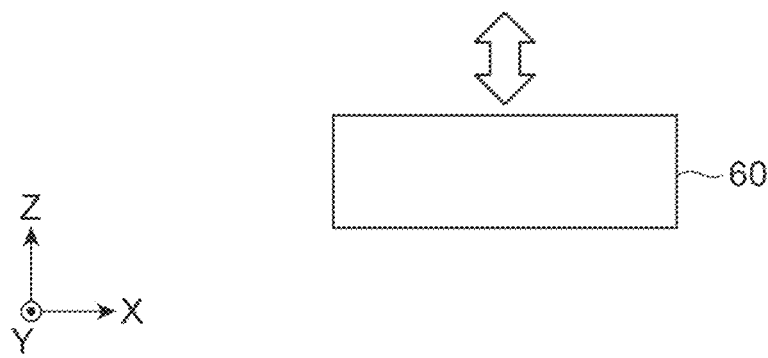

The following describes embodiments of the present disclosure with reference to the drawings. X-axis direction and Y-axis direction in figures are horizontal directions, and Z-axis direction is a vertical direction. The X-axis direction, the Y-axis direction, and the Z-axis direction are axial directions orthogonal to each other in an orthogonal coordinate system in three-dimensional space. In the following description, the same or equivalent elements are designated by the same reference numerals, and duplicate description is to be omitted.

(Configuration of Additive Manufacturing Apparatus)

The following describes a configuration of an additive manufacturing apparatus 1 according to this embodiment with reference to FIGS. 1 to 4. FIGS. 1 to 4 are schematic diagrams showing the configuration of the additive manufacturing apparatus 1 according to the embodiment. As shown in FIG. 1, the additive manufacturing apparatus 1 includes a roll coater 10, a supply unit 20, a drive unit 30, a stage 40, an irradiation unit 50, and a control unit 60. The additive manufacturing apparatus 1 laminates a thin film F of the modeling material S layer by layer to manufacture a three-dimensional modeled object M. The modeling material S is a material for the modeled object M. The thin film F of the modeling material S is laminated layer by layer on a stage 40 by the roll coater 10.

In this embodiment, the modeling material S includes a photocurable resin and a sintering material. The modeling material S is, for example, a slurry. The photocurable resin is, for example, an ultraviolet curable resin. The photocurable resin is specifically an epoxy resin or an acrylic resin. The sintering material is, for example, a ceramic powder or a metal powder. The sintering material is specifically SiC (silicon carbide), $Si_3N_4$ (silicon nitride), or cermet. In this embodiment, the content of the sintering material in the modeling material S is 40% by mass or more and 70% by mass or less. As the content of the sintering material in the modeling material S increases, the viscosity of the modeling material S increases.

The roll coater 10 has a first roll 11 and a second roll 12. The first roll 1 has a cylindrical shape centered on a first axis parallel to the Y-axis direction. The second roll 12 has a cylindrical shape centered on a second axis parallel to the first axis. The second axis, which is parallel to the first axis, is parallel to the Y-axis. The first roll 11 includes a first roll surface 11a configuring a curved surface of a cylinder in the radial direction. The second roll 12 includes a second roll surface 12a configuring a curved surface of a cylinder in the radial direction. The first roll 11 is rotatably provided with the first axis as the rotation center. The second roll 12 is rotatably provided with the second axis as the rotation center. The first roll 11 and the second roll 12 are each provided with, for example, a rotation drive unit (not shown), and the rotation direction and the rotation speed are controlled. In this embodiment, the first roll surface 11a and the second roll surface 12a are made of ceramic. The ceramic is, for example, zirconia or alumina zirconia.

The first roll 11 and the second roll 12 rotate in different directions from each other. When the first roll 11 rotates in one direction (an example of a first direction), the second roll 12 rotates in the direction opposite to the one direction. In this embodiment, the first roll 11 rotates clockwise around the first axis at a first peripheral speed. The second roll 12 rotates counterclockwise around the second axis at a second peripheral speed. The first peripheral speed is, for example, 30 mm/sec. The second peripheral speed is, for example, 60 mm/sec. The ratio of the second peripheral speed to the first peripheral speed (second peripheral speed/first peripheral speed) is, for example, 2.

The second roll 12 is arranged apart from the first roll 11. The gap between the first roll 11 and the second roll 12 can be adjusted, for example, in the range of 20 μm or more and 1 mm or less. The roll coater 10 passes the modeling material S between the first roll surface 11a and the second roll surface 12a. The roll coater 10 passes the modeling material S through the gap between the first roll 11 and the second roll 12. The modeling material S is rolled out between the first roll surface 11a and the second roll surface 12a, and is wound around the second roll surface 12a. The modeling material S, which has passed between the first roll surface 11a and the second roll surface 12a, is formed into a thin film F of the modeling material S on the second roll surface 12a. The thickness of the thin film F is, for example, about 10 μm. The first roll 11 and the second roll 12 may function as a roll mill by adjusting the gap between the first roll 11 and the second roll 12. When the first roll 11 and the second roll 12 function as a roll mill, the aggregates of the sintering material contained in the modeling material S are pulverized between the first roll 11 and the second roll 12. In this case, the sintering material is the primary particle, and the aggregates of the sintering material is the secondary particle.

The roll coater 10 further has a blade 13. The blade 13 is arranged in such a way as to face the lower part of the first roll 11 in the Z-axis direction, for example. The blade 13 removes the modeling material S remaining on the first roll surface 11a. The modeling material S remaining on the first roll surface 11a is the modeling material S that has passed between the first roll surface 11a and the second roll surface 12a. The modeling material S removed by the blade 13 is to be collected and reused.

The supply unit 20 supplies the modeling material S to the roll coater 10. In this embodiment, the supply unit 20 is arranged above the roll coater 10 in the Z-axis direction. The roll coater 10 pours the modeling material S onto the rotating first roll 11. The modeling material S is formed into a liquid pool P above the gap between the first roll 11 and the second roll 12. The modeling material S accumulated in the liquid pool P sequentially passes between the first roll surface 11a and the second roll surface 12a.

The drive unit 30 changes the relative position between the roll coater 10 and the stage 40. The roll coater 10 is arranged so that the second roll 12 is located above the stage 40. In this embodiment, the drive unit 30 is connected to the roll coater 10. The drive unit 30 moves the roll coater 10 on the stage 40 in a direction orthogonal to the second axis at a feed speed faster than the second peripheral speed. As an example, the drive unit 30 moves the roll coater 10 in the X-axis direction. The direction in which the roll coater 10 moves is the tangential direction at the contact point between the second roll 12 and the stage 40 as seen from the Y-axis direction. The direction in which the roll coater 10 moves is a direction that does not interfere with the rotation of the second roll 12. The direction in which the roll coater 10 moves is opposite to the direction of the angular velocity at the contact point between the second roll 12 and the stage 40. The contact point between the second roll 12 and the stage 40 includes the contact point between the second roll 12 and the thin film F already laminated and cured on the stage 40. For example, when the second roll 12 rotates counterclockwise, the direction in which the roll coater 10 moves is the negative direction on the X-axis. The negative direction of the X-axis is the direction opposite to the direction indicated by the arrowhead of the arrow in the X-axis direction. When the second roll 12 rotates clockwise, the direction in which the roll coater 10 moves is the positive direction of the X-axis. The positive direction of the X-axis is the direction indicated by the arrowhead of the arrow in the X-axis direction. The drive unit 30 may be connected to the stage 40. When the drive unit 30 is connected to the stage 40, the drive unit 30 moves the stage 40 so that the roll coater 10 moves as viewed from the stage 40.

A thin film F formed on the second roll surface 12a is laminated onto the stage 40. The thin film F of the second roll surface 12a is laminated in such a way as to be pressed onto the stage 40. The distance between the second roll surface 12a and the stage 40 is adjusted to a predetermined distance that equals the thickness of the thin film F or less. The roll coater 10 moves with respect to the stage 40 at a feed speed faster than the second peripheral speed. Therefore, the thin film F formed on the roll surface of the roll coater 10 is pressed against the stage 40 and laminated in such a way as to be peeled off from the second roll surface 12a. The "lamination onto the stage 40" includes not only the case in which the thin film F is laminated onto the upper surface of the stage 40, but also the case in which the thin film F is laminated onto the thin film F that has been laminated and cured on the upper surface of the stage 40.

Figure 2:
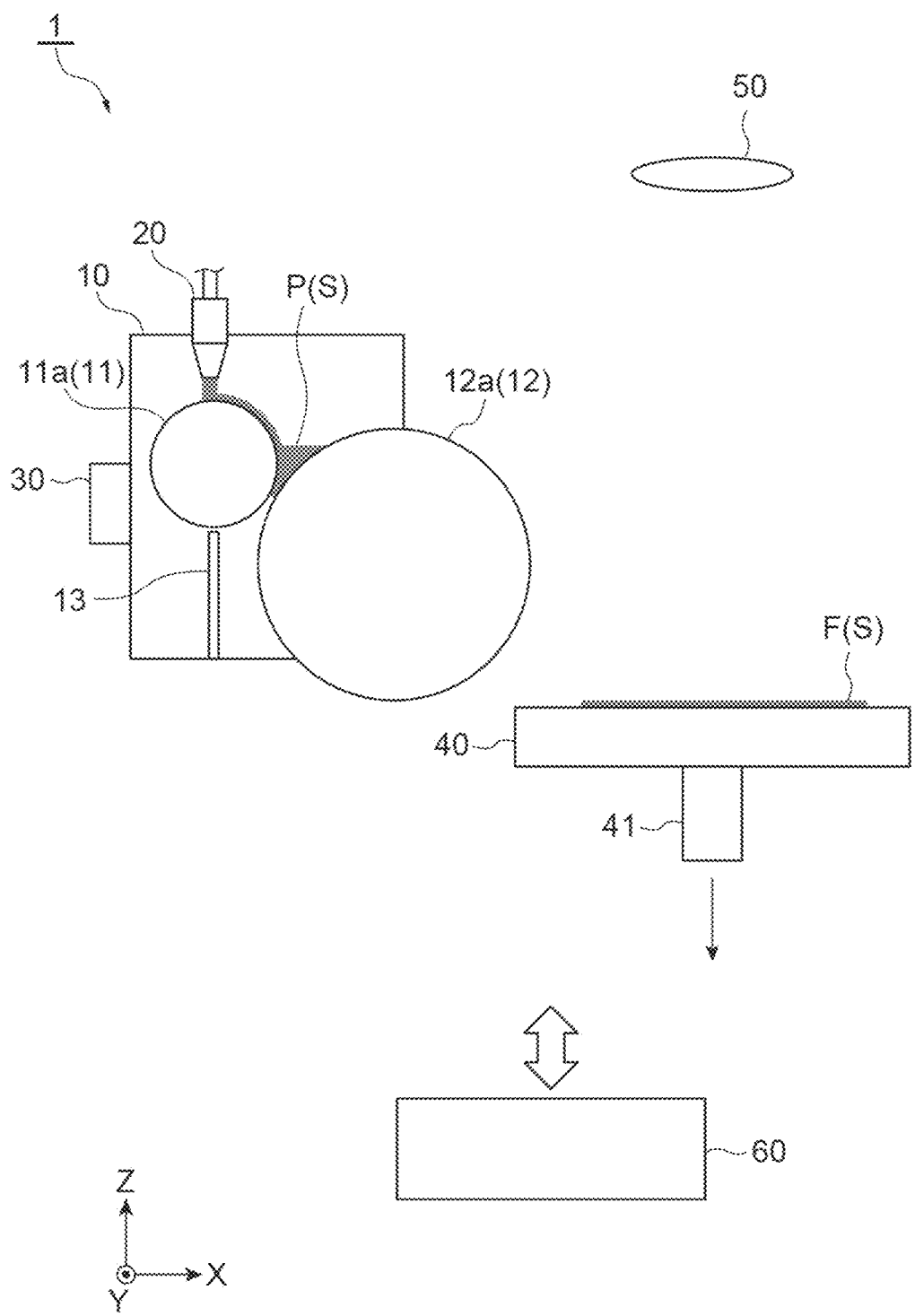
FIG. 2 is a schematic diagram showing the configuration of the additive manufacturing apparatus according to the embodiment.

The stage 40 has an adjustment mechanism 41. As shown in FIG. 2, the adjustment mechanism 41 adjusts the distance between the second roll 12 and the stage 40. The adjustment mechanism 41 adjusts the distance between the second roll 12 and the stage 40 so as to enable the next laminating. In this embodiment, the upper surface of the stage 40 on which the thin film F is laminated is a plane extending in the X-axis direction and the Y-axis direction. The adjustment mechanism 41 adjusts the stage 40 in such a way as to separate by about the thickness of the thin film F in the Z-axis direction, for example. The Z-axis direction is the height direction. The stage 40 does not need to have the adjustment mechanism 41. In this case, the roll coater 10 may be configured to have the adjustment mechanism 41.

Figure 3:
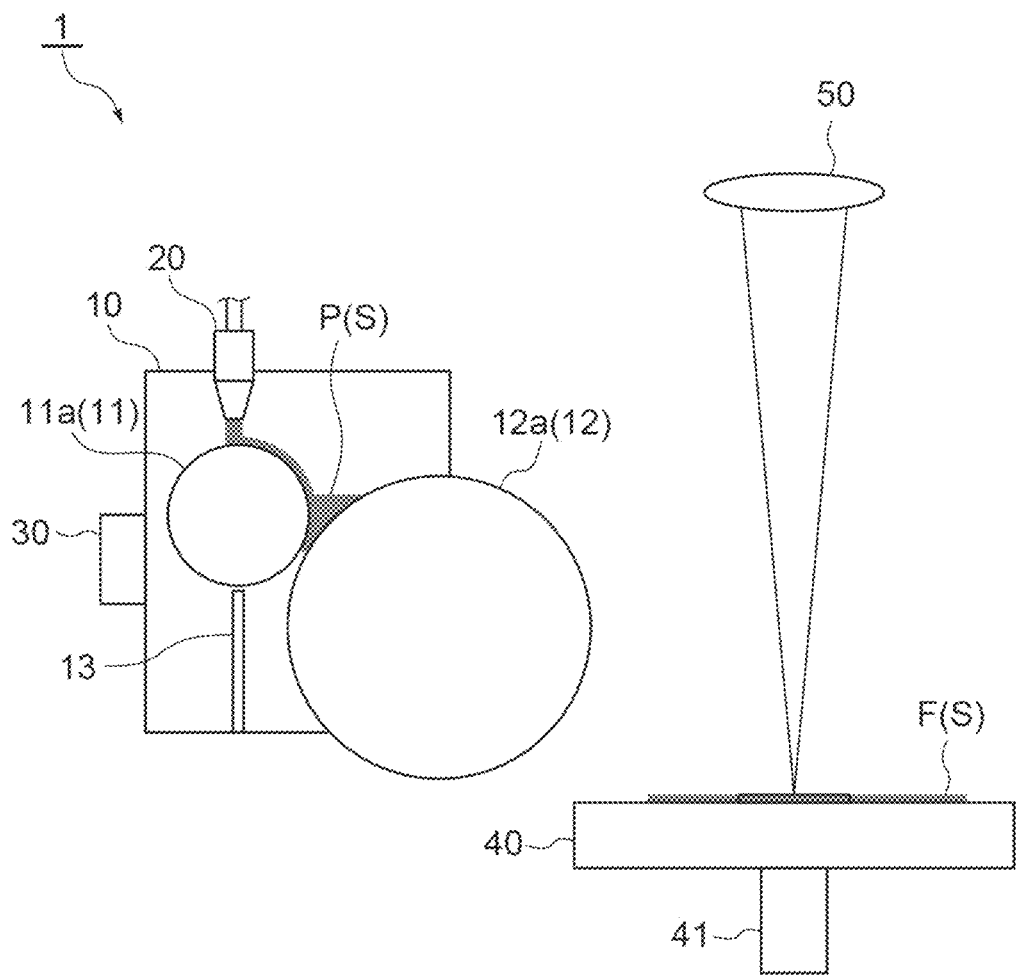
FIG. 3 is a schematic diagram showing the configuration of the additive manufacturing apparatus according to the embodiment.

The irradiation unit 50 radiates a laser that cures the thin film F laminated on the stage 40. As shown in FIG. 3, in this embodiment, the irradiation unit 50 radiates an ultraviolet laser. The irradiation unit 50 has a laser oscillator (not shown) and a galvanometer mirror (not shown). The irradiation unit 50 scans the thin film F so that the focal point of the laser moves along a predetermined shape as viewed from the Z-axis direction. The region of the thin film F scanned by the laser cures. Specifically, the photocurable resin contained in the thin film F is cured.

The control unit 60 controls the operation of elements of the above-mentioned additive manufacturing apparatus 1. For example, the control unit 60 controls: the respective peripheral speeds of the first roll 11 and the second roll 12; the supply amount of the modeling material S that the supply unit 20 supplies; the feed speed and the feed direction of the drive unit 30; the adjustment amount of adjustment mechanism 41; and the position of the focal point of the laser that the irradiation unit 50 radiates.

Figure 4:
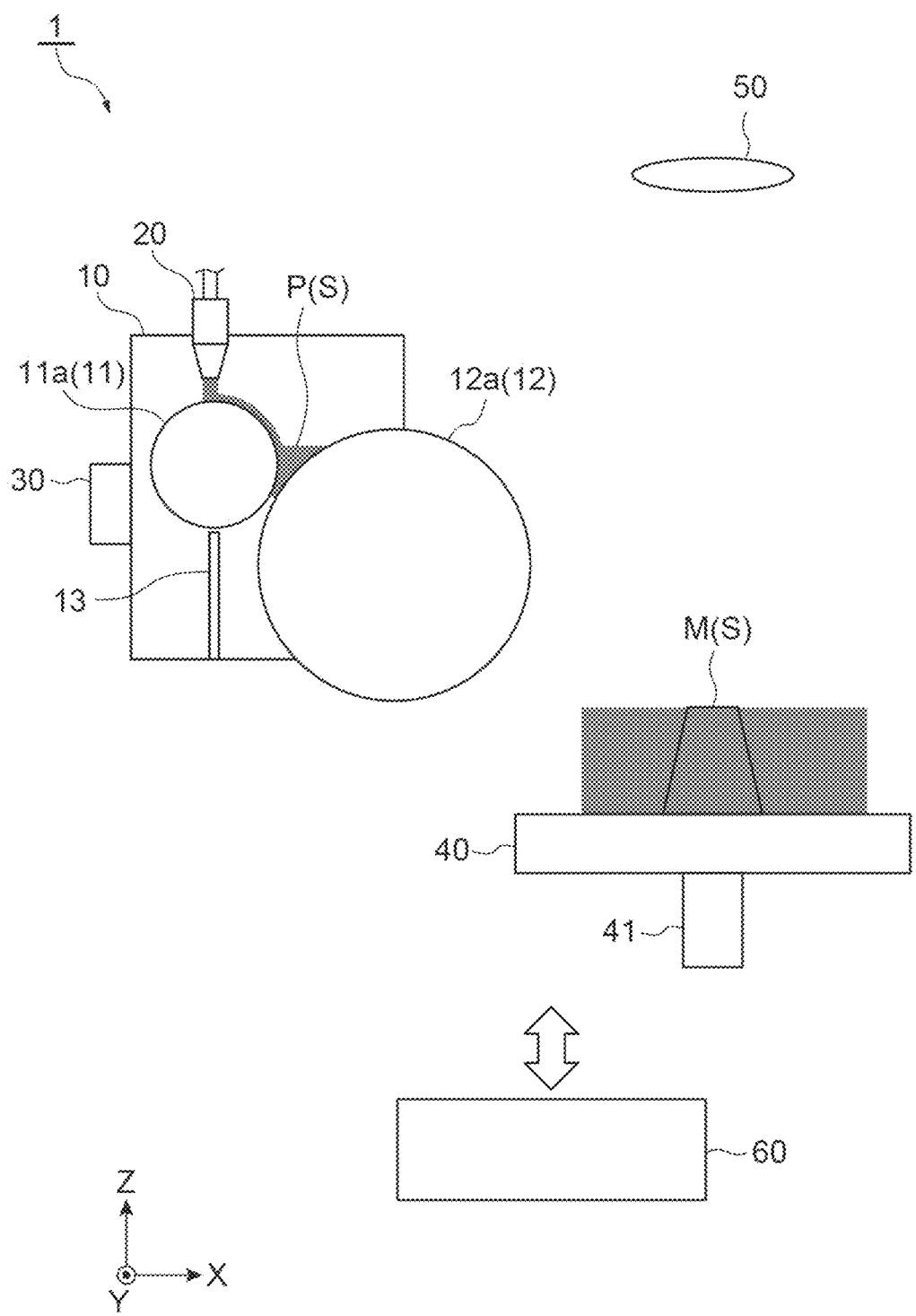
FIG. 4 is a schematic diagram showing the configuration of the additive manufacturing apparatus according to the embodiment.

As described above, the additive manufacturing apparatus 1 laminates a thin film F of the modeling material S layer by layer. As shown in FIG. 4, the additive manufacturing apparatus 1 laminates a predetermined number of thin films F along the Z-axis direction to form a modeled object M. In a post-process, heat treatment is performed on the modeled object M. The heat treatment degreases the photocurable resin of the modeled object M and sinters the sintering material of the modeled object M.

(Process of Additive Manufacturing Method)

Figure 5:
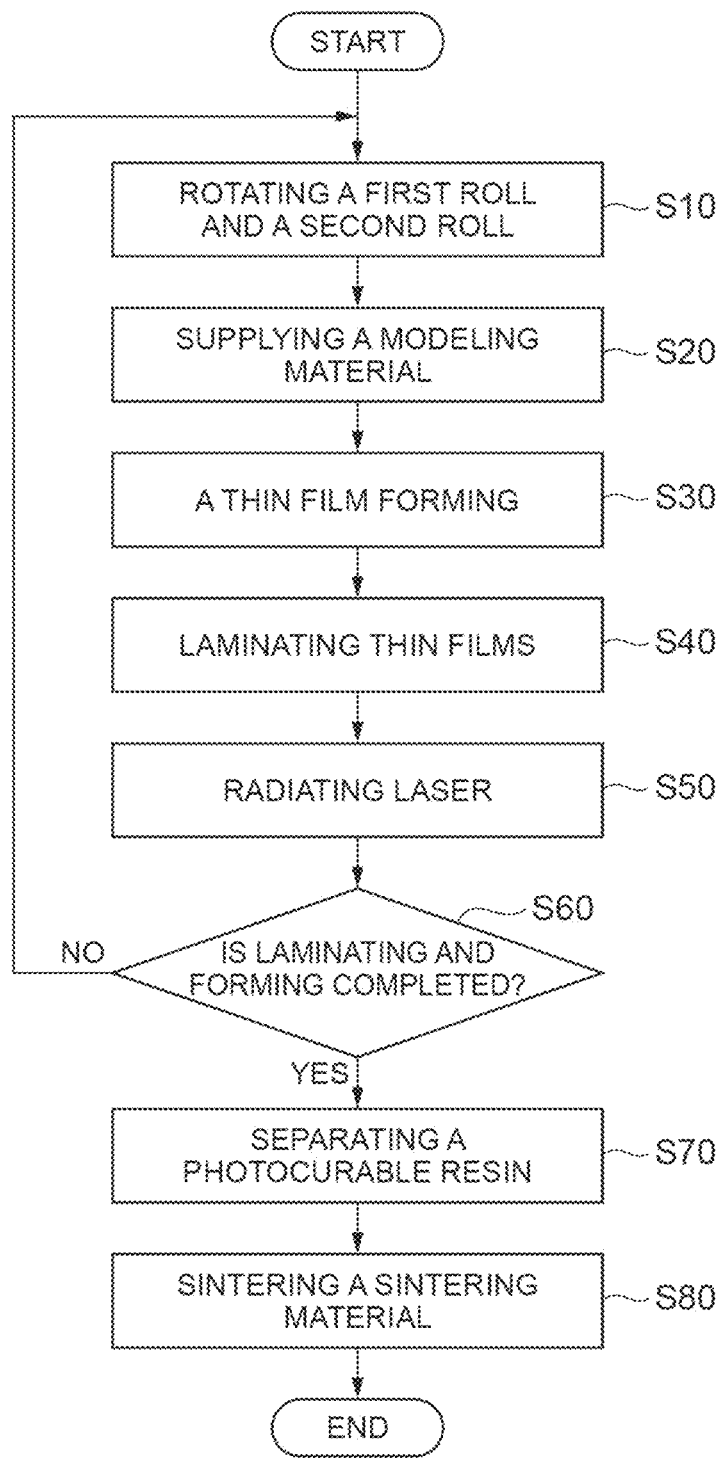
FIG. 5 is a flowchart showing the additive manufacturing method according to the embodiment.

The next describes the process of an additive manufacturing method according to this embodiment with reference to FIGS. 1 to 5. FIG. 5 is a flowchart showing an additive manufacturing according to this embodiment. In the additive manufacturing method according to this embodiment, a plurality of thin films are laminated to form a modeled object M. In this embodiment, an operator or the like carries out the additive manufacturing method using the additive manufacturing apparatus 1.

First, rotating a first roll and a second roll (step S10) is carried out. In the step S10, the first roll 1l rotates in the first direction at the first peripheral speed. The second roll 12 rotates in the direction opposite to the first direction at the second peripheral speed faster than the first peripheral speed.

Next, a supplying modeling a material (step S20) is carried out. In the step S20, the modeling material S is supplied to the roll coater 10 having the first roll 11 and the second roll 12. In this embodiment, the modeling material S contains a photocurable resin and a sintering material. The modeling material S is supplied by the supply unit 20. With the modeling material S supplied to the roll coater 10, a liquid pool P forms above the part between the first roll 11 and the second roll 12.

Next, the thin film forming (step S30) is carried out. In the step S30, the modeling material S in the liquid pool P is sequentially passes between the first roll 11 and the second roll 12 to be formed into a thin film F on the second roll surface 12a.

Next, a laminating thin films (step S40) is carried out. In the step S40, the roll coater 10 is arranged so that the second roll 12 is located on the stage 40. The roll coater 10 moves at a feed speed higher than the second peripheral speed in the direction orthogonal to the second axis. The thin film F formed on the second roll surface 12a is laminated onto the stage 40. The step S10, the step S20, the step S30 and the step S40 are carried out continuously. The thin film F is laminated in a predetermined range on the stage 40.

Next, radiating laser (step S50) is carried out. In the step S50, a laser that cures the thin film F is radiated to the thin film F laminated on the stage 40. In this embodiment, the irradiation unit 50 scans the thin film F so that the focal point of the laser moves along a predetermined shape. The thin film F in the region, where the laser is radiated, is cured.

Next, determining (step S60) is carried out. In the step S60, it is determined whether the processes from step S10 to step S50 are repeatedly executed for the number of times of laminating. If it is determined that the processes are not repeatedly executed (step S60: NO), the distance between the stage 40 and the second roll 12 is adjusted so that the next step S60 can be carried out. In this embodiment, the adjustment mechanism 41 adjusts the position of the stage 40 in the Z-axis direction. The adjustment mechanism 41 adjusts the position of the stage 40 so that the upper surface of the thin film F is always in a constant position in the Z-axis direction, for example. The distance between the stage 40 and the second roll 12 may be adjusted prior to the step S50. After that, the processes from step S10 to step S50 are repeatedly executed. When it is determined that the processes are repeatedly executed (step S60: YES), the lamination forming of the modeled object M ends. The modeled object M is a laminate of thin films F cured along a predetermined shape. In this embodiment, the modeled object M is taken out from the additive manufacturing apparatus 1 by an operator or the like.

Next, a separating the photocurable resin (step S70) is carried out. In the step S70, the photocurable resin is separated from the modeled object M by heat treatment. In this embodiment, an operator or the like carries out the step S70 using an electric furnace or the like.

Finally, a sintering the sintering material (step S80) is carried out. In the step S80, the sintering material of the modeled object M is sintered by heat treatment. In this embodiment, an operator or the like carries out the step S70 using an electric furnace or the like. The step S70 and the step S80 may be carried out in one step. By execution of the flowchart shown in FIG. 5, a sintered product in the shape of the modeled object M is manufactured.

Summary of Embodiments

In this embodiment, the modeling material S is formed into a thin film F between the first roll surface 11a and the second roll surface 12a. The thin film F is formed on the second roll surface 12a of the second roll 12, which has a faster peripheral speed than the first roll 11. The drive unit 30 moves the roll coater 10 on the stage 40 in a direction orthogonal to the second axis. The thin film F of the second roll surface 12a is laminated onto the stage 40. In a case in which the modeling material is supplied on the stage 40, then the excess modeling material is scraped off with a blade that travels straight in the horizontal direction, and thereby a thin film is formed, a scratch-like groove may be made thereon. When there is such a groove in the thin film, the layer formed on the groove becomes thicker by the depth of the groove, and the laser light from a predetermined laser output may not reach sufficiently. In the part where the laser light does not reach sufficiently, the curing is insufficient, and this affects the strength of the modeled object. On the other hand, the additive manufacturing apparatus 1 and the additive manufacturing method can increase the moving speed of the roll coater 10 without considering the scratch damage to the thin film F of the modeling material S. This can increase the manufacturing speed of the modeled object M as compared with the additive manufacturing apparatus that forms the layer with the blade.

In this embodiment, the drive unit 30 moves the roll coater 10 on the stage 40 at a feed speed faster than the second peripheral speed. Since the thin film F of the modeling material S moves to the stage side where the speed is high, the additive manufacturing apparatus 1 can reliably laminate the thin film F of the modeling material S.

In this embodiment, the modeling material S contains a photocurable resin and a sintering material. The modeling material S containing the photocurable resin and the sintering material is formed into the thin film F between the first roll 11 and the second roll 12. In this case, the modeling material S containing the photocurable resin and the sintering material is formed thinner than in the case in which the layer is formed with the blade. The thinly formed modeling material S containing the photocurable resin and the sintering material facilitates the transmission of light, so that the curing failure of the photocurable resin is reduced. Therefore, the additive manufacturing apparatus 1 and the additive manufacturing method can cure the modeling material S if the sintering material is a material that easily absorbs light.

In this embodiment, at least one of the first roll surface 11*a* and the second roll surface 12*a* is made of ceramic. Making the roll surface of ceramic causes at least one of the first roll surface 11*a* and the second roll surface 12*a* to be prevented from wear by the sintering material, as compared to the case in which at least one surface of the first roll 11 and the second roll 12 is made of a metal or the like.

The above describes various exemplary embodiments. However, various omissions, substitutions, and changes may be made without being limited to the above embodiments.

Figure 6:
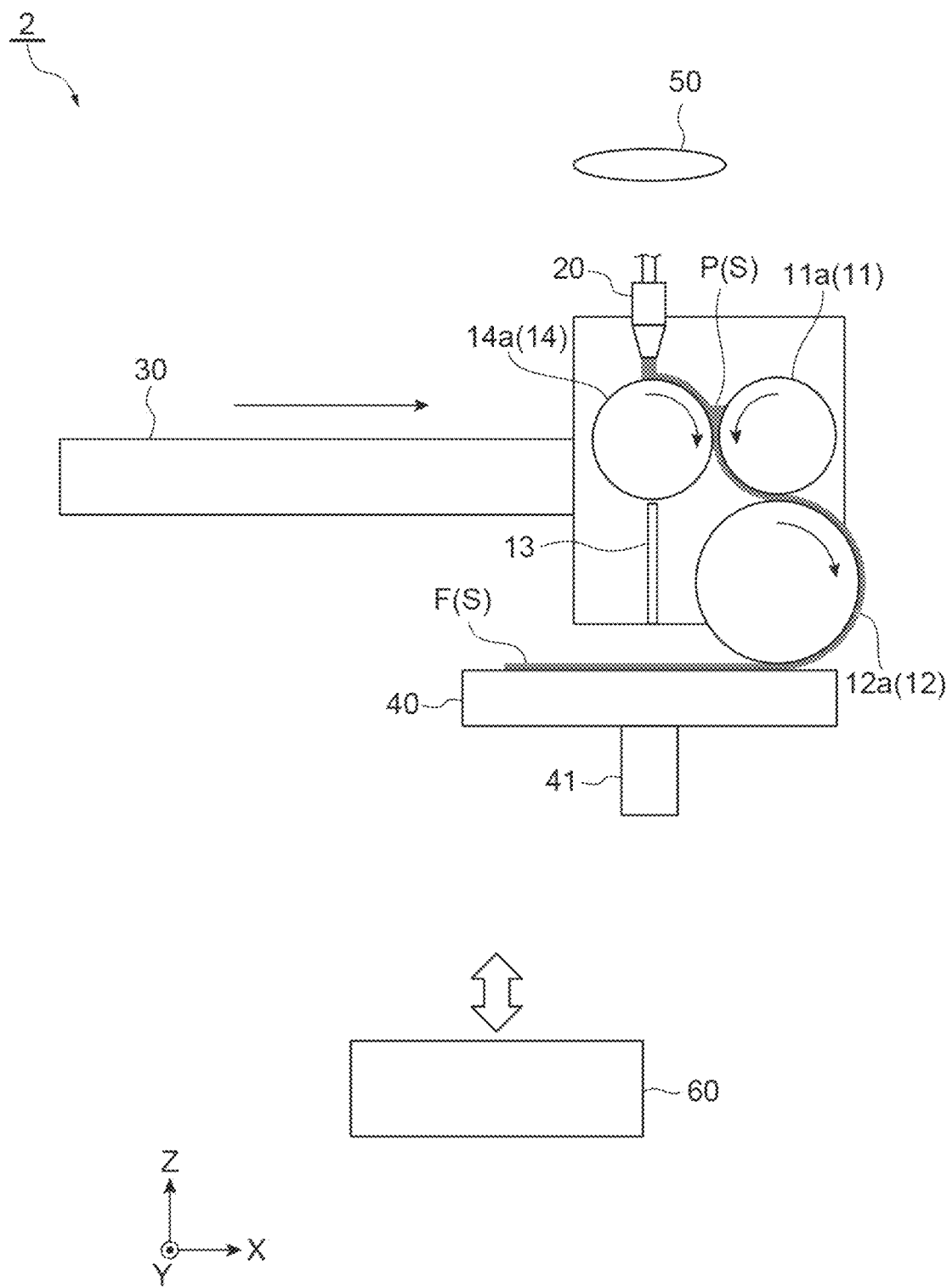
FIG. 6 is a schematic diagram showing a configuration of an additive manufacturing apparatus according to a modified example.

With reference to FIG. 6, the following describes a configuration of an additive manufacturing apparatus 2 according to the modified example of this embodiment. FIG. 6 is a schematic diagram showing the configuration of the additive manufacturing apparatus 2 according to the modified example of this embodiment. This modified example differs from this embodiment described above with respect to the configuration of the roll coater 10. The following mainly describes the differences between this embodiment described above and the modified example.

The roll coater 10 has a third roll 14. The third roll 14 is arranged apart from the first roll 11. In the modified example, the gap between the third roll 14 and the first roll 11 is larger than the gap between the first roll 11 and the second roll 12. The gap between the first roll 11 and the second roll 12 is smaller than the gap between the third roll 14 and the first roll 11. The third roll 14 includes a third roll surface 14*a* that configures a curved surface in the radial direction. The third roll 14 rotates clockwise around a third axis parallel to the first axis at a third peripheral speed slower than the first peripheral speed. For example, the third roll 14 rotates around the third axis parallel to the Y-axis direction in the direction opposite to the first direction at a third peripheral speed slower than the first peripheral speed. The first peripheral speed is faster than the third peripheral speed. In the modified example, the first roll 11 rotates counterclockwise around the first axis at the first peripheral speed. The second roll 12 rotates clockwise around the second axis at the second peripheral speed. The supply unit 20 pours the modeling material S into the rotating third roll 14. With the modeling material S, a liquid pool P forms above the gap between the third roll 14 and the first roll 11. The modeling material S accumulated in the liquid pool P sequentially passes between the third roll surface 14*a* and the first roll surface 11*a*.

The modeling material S passes between the third roll surface 14*a* and the first roll surface 11*a*, and is formed into a thick film of the modeling material S on the first roll surface 11*a*. The thick film formed on the first roll surface 11*a* is thicker than the thin film F formed on the second roll surface 12*a*. The thick film formed on the first roll surface 11*a* passes between the first roll 11 and the second roll 12. The thick film of the modeling material S that has passed between the first roll 11 and the second roll 12 is formed into a thin film of the modeling material S on the second roll surface 12*a*.

In the modified example, the modeling material S is formed into a thick film between the third roll surface 14*a* and the first roll surface 11*a*. The thick film of the modeling material S is formed on the first roll surface 11*a*, which has a faster peripheral speed than the third roll. The thick film on the first roll surface 11*a* is formed into the thin film F between the first roll 11 and the second roll 12. With this configuration, the thin film F on the second roll surface 12*a* is formed from the thick film of the modeling material S formed between the third roll and the first roll 11. This configuration allows forming a thin film F with a more uniform thickness than a configuration without the third roll.

As described above, the additive manufacturing apparatus 2 can increase the manufacturing speed of the modeled object M. At the same time, the additive manufacturing apparatus 2 can form a thin film F with a more uniform thickness than the additive manufacturing apparatus 1.

The modeling material S may contain a thermosetting resin instead of the photocurable resin described above. In this case, the irradiation unit 50 radiates, for example, a fiber laser. The laser-radiated region of the thin film F laminated on the stage 40 cures by heat generation.

REFERENCE SIGNS LIST 1,2: additive manufacturing apparatus, 10: roll coater, 11: first roll, 11*a*: first roll surface, 12: second roll, 12*a*: second roll surface, 13: blade, 14: third roll, 14*a*: third roll surface, 20: supply unit, 30: drive unit, 40: stage, 41: adjustment mechanism, 50: irradiation unit, 60: control unit, S: modeling material, M: modeled object, F: thin film,

What is claimed is:

1. An additive manufacturing apparatus configured to laminate a plurality of thin films to form a modeled object, the additive manufacturing apparatus comprising:
 a stage;
 a roll coater, including a first roll, a second roll and a third roll, configured to form each of the thin films, the thin film being made of a modeling material, the modeling material being a material of the modeled object; and
 a drive unit configured to move the roll coater on the stage,
 wherein the first roll rotates around a first axis, in a first direction, at a first peripheral speed,
 the second roll, arranged apart from the first roll, rotates around a second axis parallel to the first axis, in a direction opposite to the first direction, at a second peripheral speed faster than the first peripheral speed,
 the third roll, arranged apart from the first roll, rotates around a third axis parallel to the first axis, in the direction opposite to the first direction, at a third peripheral speed slower than the first peripheral speed,
 the roll coater: is arranged so that the second roll is located on the stage;
 passes the modeling material between a first roll surface of the first roll and a second roll surface of the second roll; and thereby forms the thin film on the second roll surface,
 passes the modeling material between a third roll surface of the third roll and the first roll surface, and thereby forms a thick film, of the modeling material, on the first roll surface, the thick film being thicker than the thin film; and
 passes the thick film between the first roll surface and the second roll surface, and thereby forms the thin film, of the modeling material, on the second roll surface, and
 the drive unit moves the roll coater on the stage in a direction orthogonal to the second axis, and thereby laminates the thin film, formed on the second roll surface, onto the stage.

2. The additive manufacturing apparatus according to claim 1, wherein
the drive unit moves the roll coater on the stage at a feed speed faster than the second peripheral speed.

3. The additive manufacturing apparatus according to claim 1, wherein
the modeling material contains a photocurable resin and a sintering material.

4. The additive manufacturing apparatus according to claim 3, wherein
at least one roll surface of the first roll surface and the second roll surface is made of ceramic.

5. The additive manufacturing apparatus according to claim 1, further comprising:
a supply unit configured to supply the modeling material to the roll coater; and
an irradiation unit configured to radiate a laser light for curing the thin film laminated on the stage.

* * * * *